June 20, 1967 P. H. WINTER 3,327,180

MOUNTING FOR SEMICONDUCTORS

Filed Sept. 23, 1964

INVENTOR
PAUL H. WINTER
BY Bauer and Witherspoon
ATTORNEYS 3,327,180
MOUNTING FOR SEMICONDUCTORS Paul H. Winter, Onondaga County, N.Y., assignor to Pass & Seymour, Inc., Syracuse, N.Y., a corporation of New York Filed Sept. 23, 1964, Ser. No. 398,584
5 Claims. (Cl. 317—234)

This invention relates to semiconductors and more particularly to means for mounting semiconductors with emphasis on heat dissipation.

It is well known that semiconductors in their various forms generate substantial heat which must in some manner be removed if the unit is to operate at prescribed and desired levels of efficiency. The overall heat which must be dealt with comprises that which is developed by the semiconductor and to this must be added the environmental temperature to determine the entire heat problem.

It is well known that heat may be dissipated through convection, conduction and radiation. The ability of any mounting means to take advantage of any or all of these various heat dissipating means will to a great degree determine its advantages over other mountings.

In view of the foregoing it is an object of this invention to provide a mounting for a semiconductor particularly adapted to dissipate heat.

It is another object of this invention to provide a heat dissipating mounting for a semiconductor which may be advantageously used in printed circuit embodiments.

It is yet another object to provide a heat dissipating mounting assembly for semiconductors which is easy to assemble and yet provides optimum heat transfer between respective elements of the mounting assembly.

It is a still further object of this invention to provide a mounting assembly for a housed silicon controlled rectifier wherein the rectifier is housed in a cylindrical casing with a flat bottom and has leads extending from the top thereof, said mounting assembly including a heat absorbing base plate, a heat transfer sleeve adapted to receive the cylindrical casing with the casing bottom being flush with the sleeve bottom, a combined electrical insulating and heat transfer member fitting flush against the rectifier and sleeve bottoms for heat transfer purposes, the base plate being positioned snugly against the exposed face of the combined electrical insulating and heat transfer member and means for retaining the sleeve, rectifier and combined insulating and heat transfer member in assembled position on the base plate.

The above and other objects and advantages of this invention will become more apparent when taken in conjunction with the following detailed description and drawing showing by way of example, a preferred embodiment of this invention, and wherein.

Figure 1:
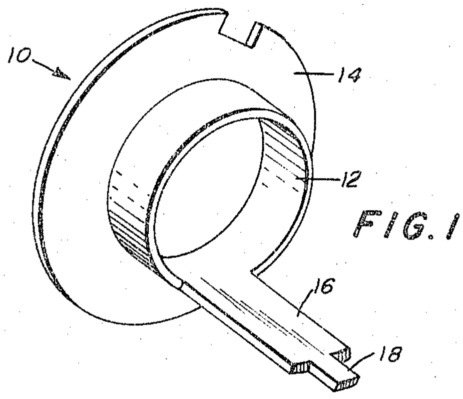
FIG. 1 is a perspective view of the heat transfer sleeve.
Figure 2:
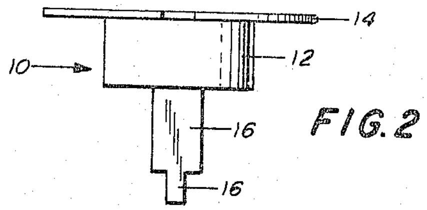
FIG. 2 is a plan view of the sleeve of FIG. 1.

Referring to FIGS. 1 and 2 the mounting assembly comprises a cylindrical heat transfer sleeve 10, said sleeve having a cylindrical wall portion 12 with a peripheral flange 14 extending perpendicularly outward from the lower bottom end of the wall portion 12. An arcuate extension 16 projects upwardly from the upper end of the vertical wall portion 12 and has a smaller tab portion 18 extending upwardly from the extremity thereof.

Figure 3:
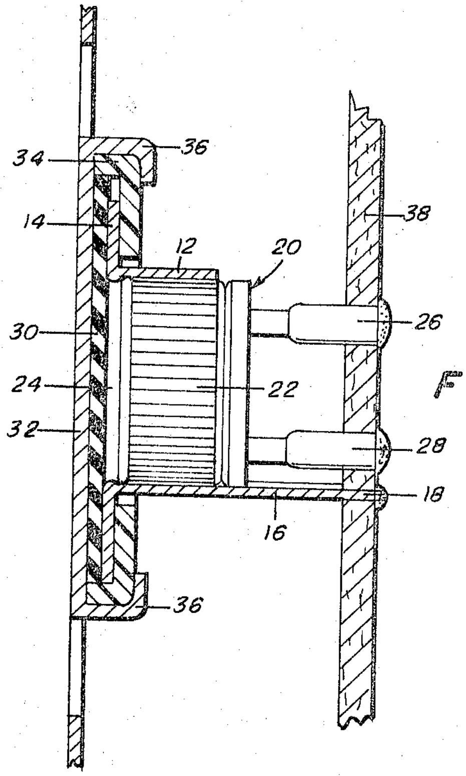
FIG. 3 is a cross-sectional view showing the manner in which the mounting assembly of this invention may be incorporated in printed circuit work.

As illustrated in FIG. 3 the sleeve 10 has press fitted thereinto a cylindrical semiconductor assembly 20. The cylindrical semiconductor assembly 20 in this instance is a silicon controlled rectifier having a cylindrical casing 22 with a flat bottom 24 and a pair of leads 26 and 28 extending from the top thereof. As shown, the cylindrical casing 22 of the silicon controlled rectifier is pressed into the vertical wall portion 12 of the sleeve 10 such that the casing bottom 24 is flush with the bottom face of the peripheral flange 14.

A combined electrical insulating and heat transfer disc 30 made of a material such as beryllium oxide generally coextensive in size with the area defined by the casing bottom 24 and the peripheral flange 14 is placed thereagainst in heat exchange relation. It has been found desirable to cover both side of the disc 30 with a silicon heat transfer grease to obtain maximum heat transfer between the parts. The disc 30 is also positioned flush against the heat transfer base plate 32. An electrical insulating cover 34 fits over the exposed faces of the peripheral flange 14. The sleeve 10 and rectifier carried thereby together with the disc 30 are held in assembled position by means of lugs 36 struck from the base plate and forced down over the insulating cover 34.

A printed circuit board 38 is suitably apertured and positioned so that contacts 26 and 28 will extend therethrough together with tab 18 of sleeve 10. Mounting the semiconductor assembly thusly makes it possible to use the sleeve as part of the electrical circuit. Such an arrangement is quite adaptable to automated soldering systems, which is another attractive feature of this mounting assembly.

As previously stated the main concern in this mounting arrangement is the transfer of heat away from the semiconductor to make certain that it will function in the proper manner. In this particular assembly the heat from the casing 22 is transferred to the wall portion 12 of the sleeve and out through the peripheral flange 14, then through the disc 30 and into the heat transfer base plate 32. In addition heat from the casing bottom 24 of the semiconductor passes through disc 30 into the base plate 32. Thus heat is removed from the side and bottom of the semiconductor.

It has been determined experimentally that the flanged area of the sleeve should be approximately equal to the sleeve area in contact with the cylindrical portion of the semiconductor.

I claim:

1. A mounting assembly for a housed semiconductor embodied in the form of a silicon controlled rectifier wherein the rectifier has a cylindrical casing with a generally flat bottom and leads extending from the top thereof, said mounting assembly comprising a cylindrical heat transfer sleeve, a peripheral flange extending generally perpendicularly outward from the bottom end of the sleeve, a supporting tab portion extending from the upper end of the sleeve, said sleeve being adapted to receive a housed silicon controlled rectifier having a cylindrical casing tightly fitting wtihin said sleeve with its casing bottom flush with the bottom of the sleeve flange, an electrically insulating and heat transfer disc fitted flush against the bottom of the rectifier and the sleeve flange, said disc being generally coextensive with the flange, a mounting-plate of heat absorbing material, said mounting-plate being placed tightly against the exposed face of said disc, insulating means fitting over the sleeve flange to electrically insulate the sleeve from the base plate and means for securing the sleeve insulating means and said disc to the base plate.

2. The invention as described in claim 1 and wherein the leads of the silicon controlled rectifier and the tab portion of the sleeve are adapted to be secured to a printed circuit board.

3. The invention as described in claim 2 and wherein the means for securing the sleeve insulating means and said disc to the mounting-plate comprises a plurality of lugs struck from the mounting-plate.

4. In combination, a housed semiconductor and mounting assembly therefor, said combination comprising a heat transfer sleeve, a peripheral flange extending perpendicularly outward from the bottom end of the sleeve, a housed semiconductor pressed into said sleeve in heat transfer relation thereto, said housed semiconductor having a flat bottom flush with the bottom face of the flange, a thin electrically insulating and heat conducting disc flush against the bottom face of the flange and semiconductor and generally coextensive therewith, an electrical insulating cover fitting over the exposed faces of the sleeve, a heat absorbing base plate fitting tight against the exposed face of the electrically insulating and heat conducting disc, means for securing the base plate to the sleeve, semiconductor, electrical insulating cover and said disc, the housed semiconductor having leads extending from its top end and a tab portion extending from the top end of said heat transfer sleeve, said leads and tab being adapted to be received by a printed circuit board for attachment thereto.

5. A mounting assembly for a housed silicon controlled rectifier wherein the rectifier has a cylindrical casing with a flat bottom and loads extending from the top thereof, said cylindrical casing constituting a part of the electrical circuit, said mounting assembly comprising a heat absorbing base plate, a heat transfer sleeve, said sleeve being adapted to receive the cylindrical casing of the rectifier, said casing having a flat bottom, wherein said flat bottom is positioned flush with the bottom of the sleeve, a combined electrical insulating and heat transfer member positioned flush against the rectifier casing bottom and the sleeve bottom for heat transfer purposes, the base plate being positioned snugly against the exposed face of the combined electrical insulating and heat transfer member, means for retaining the sleeve, housed rectifier and combined insulating and heat transfer member in assembled position on the base plate and a contact tab extending from the top end of said heat transfer sleeve, said tab and rectifier leads being adapted to be received by and secured to a printed circuit board.

References Cited

UNITED STATES PATENTS

| | | | |
|---|---|---|---|
| 2,817,048 | 12/1957 | Thuermel et al. | 317—235 X |
| 2,881,370 | 4/1959 | Colson | 317—234 |
| 2,905,873 | 9/1959 | Ollendorf | 317—235 |
| 2,917,286 | 12/1959 | Deakin | 165—80 |
| 2,935,666 | 5/1960 | Van Namen | 317—234 |
| 3,261,904 | 7/1966 | Wulc | 174—15 |

JOHN W. HUCKERT, *Primary Examiner.*

A. M. LESNIAK, *Assistant Examiner.*